US008657336B1

(12) United States Patent
    Atra

(10) Patent No.: US 8,657,336 B1
(45) Date of Patent:  Feb. 25, 2014

(54) PROTECTIVE DEVICE FOR TRUCKS

(76) Inventor: Jamal Atra, Channahon, IL (US)

(*) Notice: Subject to any disclaimer, the term of this patent is extended or adjusted under 35 U.S.C. 154(b) by 315 days.

(21) Appl. No.: 13/269,169

(22) Filed: Oct. 7, 2011

Related U.S. Application Data

(60) Provisional application No. 61/404,918, filed on Oct. 12, 2010.

(51) Int. Cl.
    *B60J 11/00* (2006.01)
(52) U.S. Cl.
    USPC ................... 280/770; 280/157; 293/112
(58) Field of Classification Search
    USPC .......... 280/770, 762, 851, 157; 293/112, 129, 293/141, 143
    See application file for complete search history.

(56) References Cited

U.S. PATENT DOCUMENTS

| | | | |
|---|---|---|---|
| 1,722,782 A * | 7/1929 | Barber ........................... | 293/123 |
| 3,432,183 A * | 3/1969 | Groll .............................. | 56/17.4 |
| 3,675,943 A * | 7/1972 | Moore et al. ................... | 280/851 |
| 3,729,221 A * | 4/1973 | Granig ............................. | 293/9 |
| 3,799,579 A * | 3/1974 | Dahl ............................. | 280/762 |
| 3,861,729 A * | 1/1975 | Williams ....................... | 293/129 |
| 4,799,576 A | 1/1989 | Walker et al. | |
| 4,813,507 A * | 3/1989 | Tanaka et al. ................ | 280/80.1 |
| 4,838,389 A | 6/1989 | Mamery | |
| 5,915,728 A * | 6/1999 | Blackburn .................... | 280/847 |
| 5,924,513 A * | 7/1999 | Jones ............................ | 180/271 |
| 6,427,411 B2 * | 8/2002 | Shows ............................ | 52/515 |
| 8,402,878 B2 * | 3/2013 | Schreiner et al. ............ | 89/36.08 |
| 2007/0235986 A1 | 10/2007 | Weagle | |

* cited by examiner

*Primary Examiner* — Katy M Ebner
*Assistant Examiner* — Emma K Frick
(74) *Attorney, Agent, or Firm* — Bay State IP, LLC

(57) ABSTRACT

A protective device for use on an axle of a flatbed of a truck to protect air hoses and mechanical mechanisms of a braking system from accidental damage caused when trucks collide with objects on the roadway. The protective device includes a grated shield that integrally couples to the axle of the flatbed through a specially designed coupling mechanism. The coupling mechanism includes a coupling bracket, having a pair of legs and a rod, and a clamping bracket for accepting the axle therein and providing stability, shock absorbency, and durability to the shield for withstanding accidental damage.

17 Claims, 3 Drawing Sheets

PROTECTIVE DEVICE FOR TRUCKS

CROSS-REFERENCE TO RELATED APPLICATION

This application claims the benefit of provisional patent application Ser. No. 61/404,918 filed in the United States Patent Office on Oct. 12, 2010.

BACKGROUND OF THE INVENTION

Field of the Invention

The invention relates to a protective device for truck braking systems, and more specifically, a protective device having a grated shield for shielding air hoses underneath a semi-trailer truck from damage caused by debris on the roadway. The protective device is coupled to an axle of the flatbed of a truck and includes a specially designed coupling mechanism having brackets and a clamping mechanism for providing stability, shock absorbency, and durability to the protective device for withstanding accidental damage.

Large trucks, for example, semi-trailer trucks, tankers, flatbed trucks, and dump trucks utilize a complex braking system. There are service brakes, which are operated by pressure placed on the brake pedal either through air pressure or by hydraulic pressure; parking brakes, which must be used only during parking and are operated by a series of heavy-duty springs; and the emergency brake system, which is simply a combination of parts from both the service brake and parking brake systems. Within each system there are variances as well.

The most commonly used brake system is the air brake system, which utilizes pressurized air to activate the braking mechanism. In all air brake systems, air passes through a brake chamber that is mounted either perpendicular or parallel to the axles on the flatbed. Pressurized air pushes the brake shoes and linings against the drums or discs to control vehicle speed when the foot brake is pressed.

Regardless of the type of braking system utilized, the braking system is located underneath the flatbed of the truck and therefore likely to incur damage from objects in the road. Objects such as road-killed animals, blown tires from other vehicles, emergency cones, and lost cargo are common causes of damage to the braking system of the truck, which occurs well before the driver has the opportunity to slow down or even stop.

In an emergency situation, the truck driver presses the brake pedal and air pressure is released. If the air pressure becomes too low, the driver is unable to fully stop or maneuver the truck away from the emergency situation. Therefore, when the driver uses the foot brake, the driver must determine within a short period of time where to off-road the truck. When there is damage to the brake chambers or air hoses due to hitting an object in the road, this causes serious disruption to the braking system. As roadway traffic increases, there is a growing need for a protective device, which shields air hoses located underneath the flatbed of the truck.

Additionally, semi-trucks require additional time and distance in order to avoid objects in the road because of the loads being transported. Therefore, protecting the braking system is extremely valuable to not only the life of the driver, but also to other passengers traveling the road.

The current invention seeks to resolve the foregoing issues at once, protecting the integral features of the braking system of a semi-truck from damage caused by objects and debris on the road.

DESCRIPTION OF THE RELATED ART

U.S. Pat. No. 4,838,389 to Mamery relates to a protective device of drum-brake operating shafts of trucks and touring trailers. This device is essentially constituted by a protective sleeve (4) mounted on the bushing (5) of the operating shaft (1) of the clearance cam (3) of the brake shoes. This sleeve (4), extended up to the operating lever (2), comprises a packing (6) at each one of the extremities of its bore. The axis of the bore (4d) is upwardly offset in relation to the axis of the sleeve (4), of a distance X corresponding to one half of the clearance arranged between the shaft (1) and the bore (4d). A sectoral wearing plate (10) is disposed at the lower portion of the bore (4d)—The sleeve (4) is mounted at the connecting bridge (8) by an annular collar (4a) with an indexing key (46) and of the housing (9), existing at the beginning, or of a tab molded with the sleeve (4).

United States Patent Application 2007/0235986 to Weagle relates to impact protector mountings and methods of using such mountings for parts or structures that are susceptible to impact or the forces of an impact. Protectors of the invention are useful to protect any parts or structures in vehicles, including bicycles, motorcycles, cars, trucks, off-road vehicles, utility vehicles, and other vehicles. Impact protector mountings of the invention can be used to protect any parts and structures, including sprockets, disc brake rotors, engine parts, bottom brackets, drivetrain components, and other components susceptible to impact damage.

U.S. Pat. No. 4,799,576 to Walker et al. is a protective device for use on a wheeled vehicle such as a tractor pulled trailer equipped with an air brake is provided. The air brake includes a housing generally disposed lengthwise of the trailer and comprises a transversely disposed diaphragm in a medial portion thereof with air pressure communicating with the front side of the diaphragm and further comprises a heavy coiled spring positioned in opposition to the air pressure on the rear side of the diaphragm. A protective device in the form of a perforated plate is mounted adjacent to and rearwardly of the housing so as to be in the path of the coiled spring in the event of rupturing of the housing, as from corrosion, and releasement of the spring therefrom, to prevent the spring from being projected rearwardly away from the housing.

While these units may be suitable for the particular purpose employed, or for general use, they would not be as suitable for the purposes of the present invention as disclosed hereafter.

SUMMARY OF THE INVENTION

It is an object of the invention to protect integral features of a large truck's braking system located underneath the flatbed of the truck from damage when colliding with objects or debris on the roadway. Accordingly, the present invention is a protective device including a grated shield having a front and back surface, wherein the back surface has a coupling mechanism for securing to an axle of the flatbed of a truck and shielding air hoses and various other mechanical mechanisms of the braking system of the truck from potential damage when the truck collides with objects on the roadway.

It is another object of the invention to secure the protective device to the flatbed of the truck without disrupting other features of the truck braking system. Accordingly, the back surface of the grated shield of the protective device includes at least two coupling mechanisms each having a bracket and clamping bracket for removably coupling the grated shield to the axle of the flatbed.

It is yet another object of the invention to provide a device that allows debris to bounce thereof, without causing damage to itself or other mechanisms of the truck. Accordingly, the grated shield of the present invention includes a lower edge which is preferably curved in design for allowing debris and material that comes in contact with the front surface of the shield to roll thereof and not damage the air hoses and mechanical mechanisms shielded therebehind.

It is another object of the invention to protect the grated shield and air hoses therebehind from extreme force caused from impact thereto. Accordingly, the coupling mechanism of the present invention includes a U-shaped clamping bracket having an internal crescent member and a coupling bracket designed to withstand force of a collision and prevent the grated shield from shifting or moving along the axle while the truck is in motion.

It is another object of the invention to provide a protective device which is straightforward to install and convenient to maintain. Accordingly, the grated shield of the protective device of the present invention installs in front of the air hoses of the truck and attaches to the flatbed axle by the uniquely designed clamping brackets with minimal effort.

It is yet another object of the invention to provide a protective device wherein multiple devices can install onto the underside of the flatbed of a truck. Accordingly, the protective device of the present invention is suitable for coupling to the front and rear axles of the flatbed and is thereby suitable for protecting air hoses throughout the braking system of the truck.

It is another object of the invention to provide a protective device that can withstand weather elements effecting road conditions in a variety of different climates and altitudes. Accordingly, the grated shield and coupling mechanism of the protective device of the present invention is made from durable hard plastic or metal that can endure all environmental conditions.

The invention is a protective device for use on the flatbed of a truck to protect air hoses and mechanical mechanisms of a braking system from accidental damage caused when trucks collide with objects on the roadway. The protective device includes a grated shield that integrally couples to the axle of the flatbed through a specially designed coupling mechanism. The coupling mechanism includes a coupling bracket, having a pair of legs and a rod, and a clamping bracket for accepting the axle therein and providing stability, shock absorbency, and durability to the shield for withstanding accidental damage.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1A:
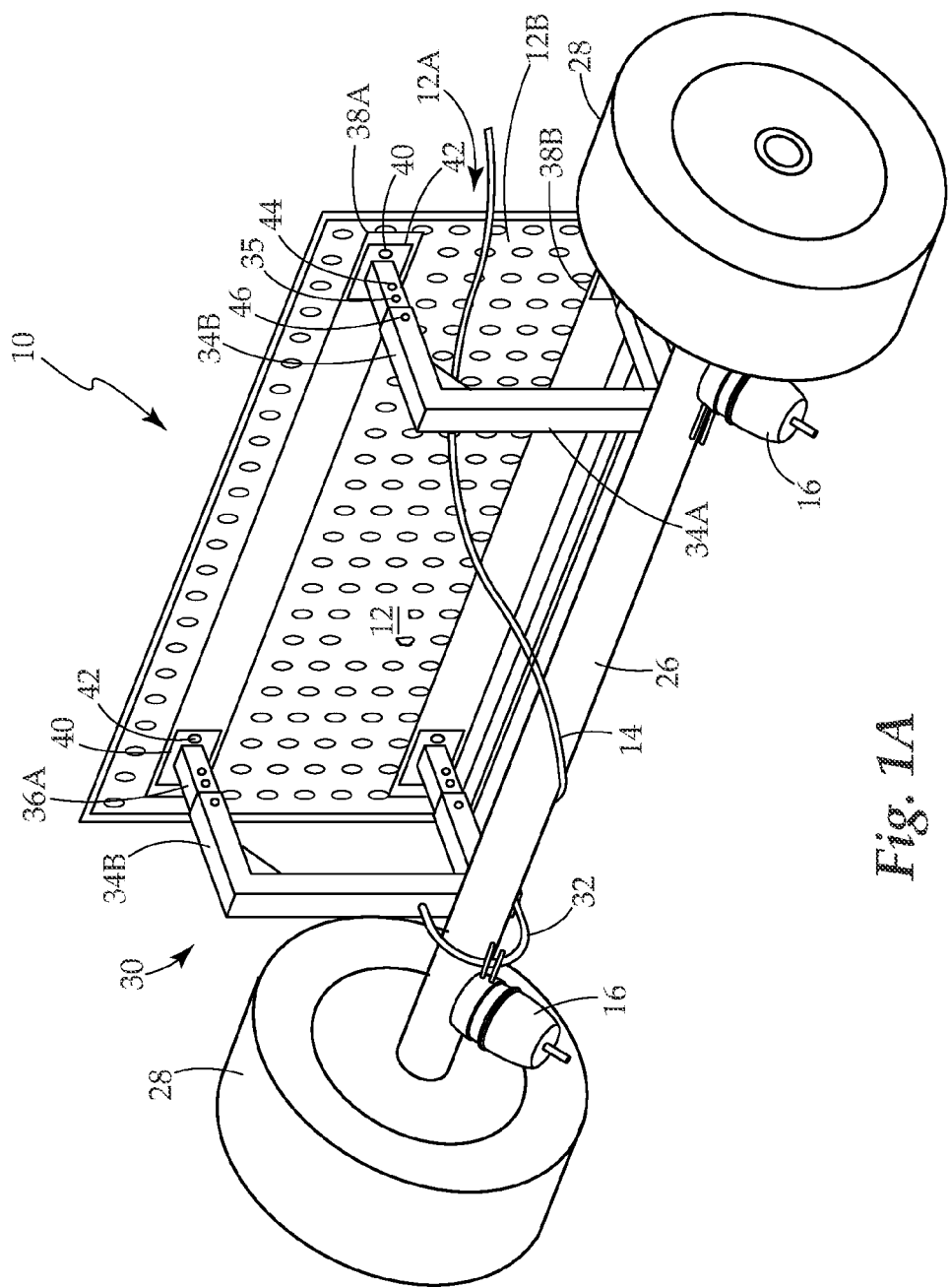
FIG. 1A is a diagrammatic perspective rear view of the protective device of the present invention for use on a truck, wherein the protective device has a grated shield for shielding air hoses of the truck and is uniquely coupled to the axle of the flatbed of the truck as shown.
Figure 1B:
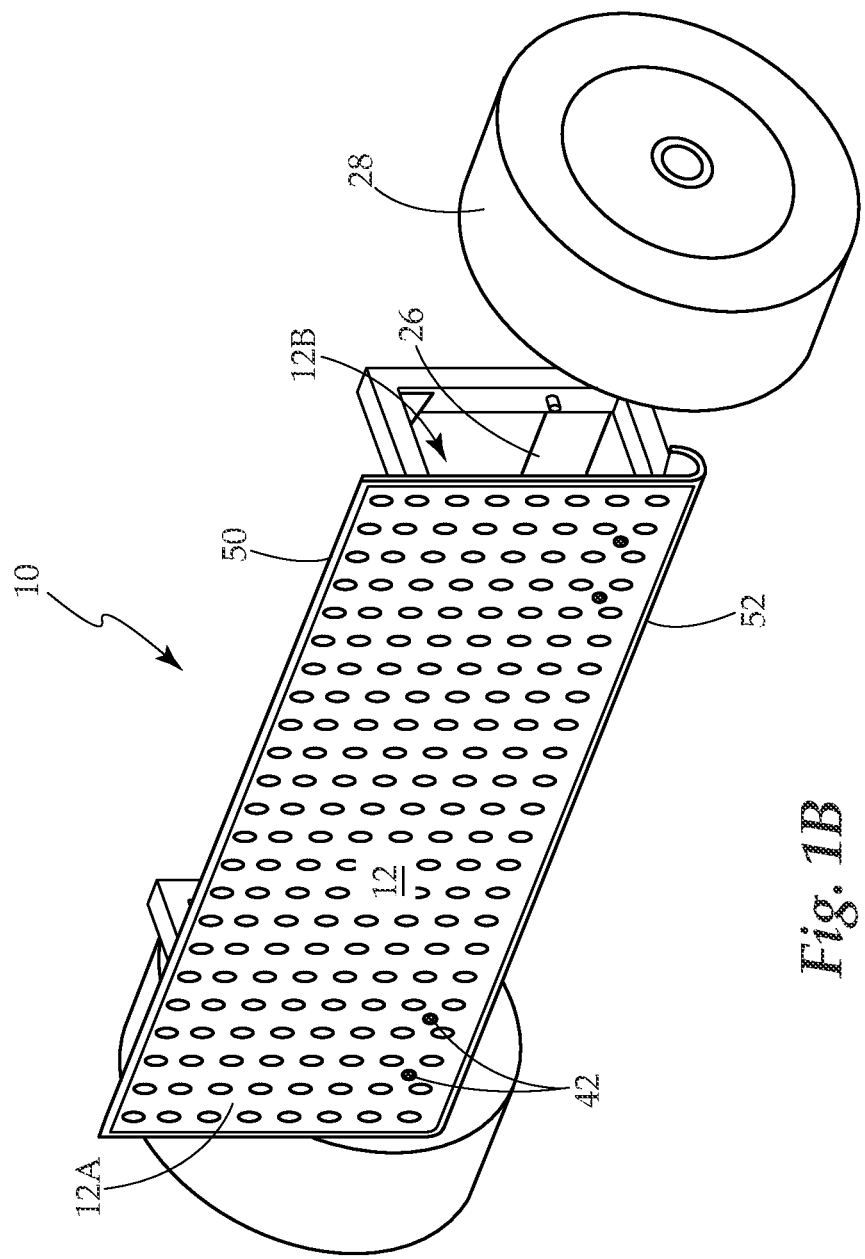
FIG. 1B is a diagrammatic perspective front view of the protective device of the present invention coupled to the axle, illustrating the front surface of the grated shield, wherein said shield has a straight upper edge and a curved lower edge.

Large scale trucks utilize a complex braking system. The structural components of the braking system are located underneath the flatbed of the truck and therefore are likely to incur accidental damage caused by running over objects in the roadway. Objects such as road-killed animals, blown tires from other vehicles, emergency cones, and lost cargo easily drift into traffic on the roadway and cause damage to the braking system of the truck well before the driver has the opportunity to slow down or even stop. FIGS. 1A and 1B illustrate the protective device 10 of the present invention positionable underneath the flatbed of a truck. Preferably, the present invention is used on semi-trucks, trailer trucks, dump trucks, tankers, or other vehicles whose flatbed is not too close to the ground. Preferably, the present invention attaches to the forward most axle of the flatbed of the truck. In alternate embodiments, the present invention may also attach to additional back axles. In its broadest context, the protective device 10 for trucks includes a grated shield 12 and at least two uniquely designed coupling mechanisms 30.

The grated shield 12 is preferably made from hard plastic, metal or other like materials that can withstand the effects of various weather and road conditions at different climates and altitudes. Additional materials are contemplated and considered to be included herein. The air hoses 14 are integral features of a braking system on any large-scale truck, and specifically connect the brake chambers 16 along the underside of the flatbed of the truck. Typically, one air hose connects directly from one brake chamber to the other, while the other air hose connects the pair of brake chambers through a compressor.

In the preferred embodiment, the grated shield 12 is three feet and one half inch in length and between eighteen inches and twenty-three inches in width. Other dimensions are contemplated. In alternate embodiments, the grated shield 12 can extend along the axle 26 any given length, including extending the entire length of the axle 26, or from one brake chamber 16 to the other. Other dimensions of the shield 12 are contemplated to encompass shielding air hoses 14 of large trucks with varying dimensions. The grated shield 12 has a front surface 12A and a back surface 12B, wherein the front surface 12A is orientated in the forward facing direction in relation to the truck (shown in FIG. 1B), while the back surface 12B is orientated in the rear facing direction adjacent the axle 26 (shown in FIG. 1A). The grated shield 12 has an upper edge 50 and a lower edge 52. Preferably, the lower edge 52 is curved upwardly toward the back surface 12B. In alternate embodiments, the upper edge 50 may also be curved, but in a downwardly direction toward the back surface 12B. The curvature of the upper and lower edges 50 and 52 allows debris and material that comes in contact with the shield 12 to roll thereof and not damage the air hoses and mechanical mechanisms shielded therebehind.

While in use, the grated shield 12 stands to protect the pair of air hoses 14 from accidental damage, as well as all other hoses and mechanical mechanisms positionable therebehind. The air hoses 14 are most susceptible to damage because of their location underneath the flatbed of the truck and in close proximity to the roadway. When fallen objects or debris are left on the roadway there is an increased risk in damage occurring to the air hoses 14. When the driver of a truck presses on the brake pedal in order to avoid colliding the truck with debris on the roadway, air pressure is immediately released from the brake system. When the air pressure becomes too low, the brakes slowly stop functioning and the driver is unable to stop the truck. Therefore, the driver has very little time to react to impending situations and must quickly determine where to off-road the large vehicle. In circumstances such as these where it is impossible to slow or stop the truck in time, air hoses 14 are commonly damaged which significantly increases the risk of harm to the driver of the truck. In addition, the risk of harm to other drivers and passengers traveling on or in the vicinity of the road also increases.

The grated shield 12 includes a plurality of strong holes 22 extending therethrough. The strong holes 22 are substantially round holes and preferably have a diameter of one inch. The strong holes 22 allow for circulation of air through the grated shield 12. In alternate embodiments, air passes through the grated shield 12 by vents or other like rectangular or circular openings. In further alternate embodiments, the strong holes 22 are varied in position based on the circulation of air provided by the back surface 12B of the shield 12. In further alternate embodiments, the shield may be made of solid steel without any strong holes 22.

FIG. 1B illustrates the front surface 12A of the grated shield 12, which absorbs shock caused by impacting objects or debris in the road. FIG. 1A illustrates the rear surface 12A of the grated shield, which uniquely couples to the axle 26 by at least two coupling mechanisms 30. The axle 26 on the flatbed of a large truck is an integral structural component of the truck and is useful for maintaining the position of the wheels 28 relative to one other and to the truck. The axle 26 must bear the weight of the truck plus the acceleration and braking forces.

The shield 12 includes two elongated anchor plates 38 extending horizontally along the back surface 12B, wherein the upper anchor plate 38A is substantially adjacent the upper edge 50 and the lower anchor plate 38B substantially adjacent the lower edge 52. The elongated anchor plates 38 are preferably welded to the shield 12 so as to provide a fixed surface for attaching the shield 12 to the coupling mechanisms 30. Preferably, the anchor plates 38 are made from metal or other like strong and durable material.

Figure 2:
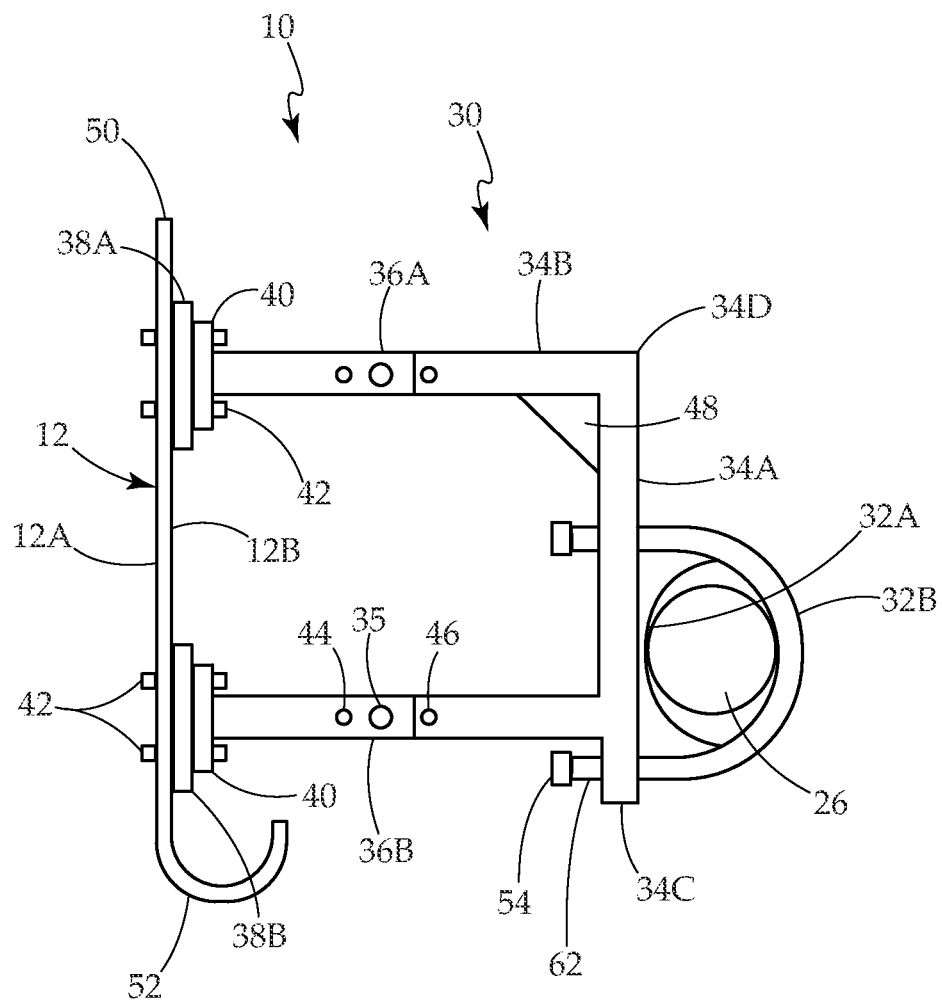
FIG. 2 is a cross-sectional view of the protective device of the present invention, including a specially designed coupling mechanism having a coupling bracket and U-shaped clamping bracket for securing the grated shield to the axle of the flatbed.

FIG. 2 illustrates a cross-sectional view of one of the unique coupling mechanisms 30 of the present invention, which secures the grated shield 12 to the axle 26 of the flatbed of the truck in position for use. In the preferred embodiment, illustrated in FIGS. 1A and 1B, the shield is secured by two coupling mechanisms 30. In alternate embodiments, more than two coupling mechanisms 30 may be used to support and secure the shield 12. The coupling mechanism includes two hollow legs 36, an upper hollow leg 36A and a lower hollow leg 36B, each having at least two holes 44 similarly positionable therethrough. The upper hollow leg 36A is coupled to the upper anchor plate 38A and extends outward perpendicularly from the shield 12 approximately one foot, while the lower hollow leg 36B is coupled to the lower anchor plate 38B and similarly extends outward perpendicularly from the shield 12 approximately one foot. In the preferred embodiment, a fastening plate 40 integrally couples the upper hollow leg 36A and the lower hollow leg 36B similarly to the upper anchor plate 38A and lower anchor plate 38B respectively by a pair of bolts 42. Preferably, the fastening plate 40 is three inches in length and width. Specifically, the fastening plates 40 are welded to the hollow legs 36 and then are removable coupled by the pair of bolts 42 to the anchor plate 38 and grated shield 12 (shown in FIG. 2). In alternate embodiments, the fastening plates 40 are welded to not only the hollow legs but also to the anchor plates 38, wherein this embodiment the hollow legs 36 are approximately six inches in length.

When coupled to the anchor plates 38, both legs 36 are vertically aligned with the corresponding holes 44 therethrough similarly aligned along a common plane. The coupling mechanism includes a bracket 34, having a bar 34A coupled between a pair of receiving legs 34B each having a plurality of holes 46. The hollow legs 36 are secured within the receiving legs 34B by bolts 35 which extend through the holes of the receiving legs 34B and hollow legs 36, when said corresponding holes are aligned. The receiving legs 34B accept the hollow legs 36 and selectively telescope in a perpendicular fashion closer to and away from the shield 12. The bar 34A extends downwardly below one of the receiving legs 34B to a distal end 34C. The bracket 34 is reinforced at, at least one corner 34D, by wedge-shaped braces 48.

The coupling mechanism 30 includes a clamping bracket 32. The clamping bracket 32 is substantially circular and preferably made of metal for accepting the axle 26 therein. The clamping bracket 32 includes a U-shaped bar 32B and an internal crescent member 32A. The U-shaped bar 32B includes two ends 62. The ends 62 of the U-shaped bar 32B secure by bolts 54 to the bar 34A of the bracket 34, such that the ends 62 of the U-shaped bar 36B straddle the receiving leg 34B of the bracket 34 adjacent the distal end 34C. Specifically, one end 62 of the U-shaped bar 36A is securely positioned adjacent the distal end 34C of the bar 34A of the bracket 34, while the other end 62 of the U-shaped bar 36A is securely positioned between the receiving legs 34B of the bracket 34. The clamping bracket 32 removably secures to the bar 34A of the bracket 34 and receives the axle 26 therein. The clamping bracket 32 opens to accept the axle 26 therein and then clamps closed therearound by the bolts 54, thus locking the U-shaped bar 36A and internal crescent member 32A to the bar 34A of the bracket 34. The internal crescent member 32A is specially designed to form fit to the circumference of the axle 26 such that while in use the coupling mechanism and shield 12 do not slide or move along the axle 26 while the truck is in motion.

Preferably, the air hoses 14 are shielded by the grated shield 12 to the greatest extent possible. In alternate embodiments, the air hoses 14 may be connected together by a plurality of clamps to avoid swinging and movement.

It is extremely advantageous to secure the grated shield 12 to the axle 26 because of the strength and durability of the axle 26 as a structural component of the flatbed of the truck. In addition, the air hoses 14 and brake chambers 16 are located in close proximity to the axle 26 on all semi-trucks, therefore allowing the grated shield 12 of the present device 10 to integrate within a variety of trucks.

When debris is left in the roadway and comes into contact with the grated shield 12, the front surface 12A of the grated shield 12 is subjected to the strong force of the debris striking it. The shield 12 and coupling mechanism 30 resist the impact by absorbing the brunt force created by the truck striking the debris and thereby protect the air hoses 14 and mechanical mechanisms behind the grated shield 12 from movement, dislodging, or damage. The brackets 34 provide an extremely large shock absorbing means for the grated shield 12, such that the grated shield 12 does not come into contact with the axle 26 regardless of the strength of the force.

It is common for large trucks to have air hoses 14 around multiple axles 26 and therefore a need for multiple protective devices 10 underneath the flatbed of each truck. Therefore, the present device 10 is capable of connecting to one or more axles 26 underneath the flatbed of a truck to provide as little or as much protection as selectively desired.

In conclusion, herein is presented a protective device having a grated shield and coupling mechanism for shielding air hoses underneath the flatbed of a semi-trailer truck from damage caused by debris on the roadway. The invention is illustrated by example in the drawing figures, and throughout the written description. It should be understood that numerous variations are possible, while adhering to the inventive concept. Such variations are contemplated as being a part of the present invention.

The invention claimed is:

1. A protective device for coupling with an axle of flatbed of a truck, comprising:

a grated shield for absorbing forces from impact having a front surface and a back surface, wherein said front surface is orientated in a forward facing direction in relation to said truck and said back surface is orientated in a rear facing direction adjacent said axle, said grated shield having a lower edge curved backwardly toward said back surface and a straight upper edge, said grated shield having a plurality of substantially round holes extending therethrough, said grated shield having at least two elongated anchor plates integrally coupled and extending horizontally along said back surface, including an upper anchor plate and a lower anchor plate, wherein said upper anchor plate is substantially adjacent said upper edge and said lower anchor plate is substantially adjacent said lower edge;

at least two coupling mechanisms absorb shock from impact and couple said rear surface of said grated shield to said axle of said flatbed of said truck, wherein each said coupling mechanism has two hollow legs, including an upper hollow leg and a lower hollow leg, each said leg having at least two holes similarly positionable therethrough, wherein said upper hollow leg is coupled to said upper anchor plate of said shield and extends outward perpendicularly from said shield, wherein said lower hollow leg is coupled to said lower anchor plate and extends outward perpendicularly from said shield;

said coupling mechanism includes a pair of fastening plates, wherein one fastening plate is welded to each of said hollow legs for integrally coupling said upper hollow leg to said upper anchor plate and said shield and said lower hollow leg to said lower anchor plate and said shield;

said coupling mechanism having a bracket that includes having a bar coupled between a pair of receiving legs, each said receiving leg each having a plurality of holes, wherein said hollow legs are secured within said receiving legs by bolts which extend through said holes of said receiving legs and hollow legs when said corresponding holes are aligned, wherein said receiving legs accept said hollow legs therein and selectively telescope in a perpendicular fashion closer to and away from said shield, wherein said bar includes a distal end which extends downwardly below one of said receiving legs;

wherein said bracket has a corner having a wedge-shaped brace for reinforcement; and said coupling mechanism includes a substantially circular clamping bracket for removably securing and accepting said axle therein, said clamping bracket includes a U-shaped bar and an internal crescent member, wherein said U-shaped bar includes two ends which secure to said bar of said bracket such that said ends of said U-shaped bar straddle said receiving leg of said bracket adjacent said distal end, wherein one said end of said U-shaped bar is securely positioned adjacent said distal end of said bar of said bracket and wherein said other end of said U-shaped bar is securely positioned between said receiving legs of said bracket.

2. The protective device of claim 1, further comprising a pair of bolts for integrally coupling said fastening plates of said coupling mechanism to said anchor plates of said shield.

3. The protective device of claim 1, wherein the Fastening plates are welded to the anchor plates of the shield.

4. The protective device of claim 1, wherein the U-shaped bar is secured secure by a pair of bolts to the bar of the bracket.

5. The protective device of claim 1, further comprising a pair of bolts, which removably secure said clamping bracket around said axle and lock said U-shaped bar and internal crescent member to said bar of said bracket.

6. The protective device of claim 1, wherein a plurality of protective devices are secured around at least one axle of the flatbed of a truck.

7. A protective device for coupling with an axle of a flatbed of a truck, comprising:

a grated shield having a front surface and a back surface, wherein said grated shield having a lower edge curved upwardly toward said back surface and a straight lower edge, said grated shield having at least two elongated anchor plates integrally coupled and extending horizontally along said back surface;

at least two coupling mechanisms couple said rear surface of said grated shield to said axle of said flatbed of said truck, wherein each said coupling mechanism has two hollow legs having at least two holes similarly positionable therethrough, wherein each said hollow leg is coupled to one said anchor plate of said shield and extends outward perpendicularly from said shield;

said coupling mechanism includes a pair of fastening plates, wherein one fastening plate is welded to each of said hollow legs for integrally coupling said hollow legs to said anchor plates and said shield;

said coupling mechanism having a bracket that includes having a bar coupled between a pair of receiving legs, each said receiving leg each having a plurality of holes, wherein said hollow legs are secured within said receiving legs by bolts which extend through said holes of said receiving legs and hollow legs when said corresponding holes are aligned, wherein said receiving legs accept said hollow legs therein and selectively telescope in a perpendicular fashion closer to and away from said shield, wherein said bar includes a distal end which extends downwardly below one of said receiving legs; and said coupling mechanism includes a substantially circular clamping bracket for removably securing and accepting said axle therein, said clamping bracket includes a U-shaped bar and an internal crescent member, wherein said U-shaped bar includes two ends which secure to said bar of said bracket.

8. The protective device of claim 7, wherein said anchor plates include an upper anchor plate and a lower anchor plate, wherein said upper anchor plate is substantially adjacent said upper edge and said lower anchor plate is substantially adjacent said lower edge.

9. The protective device of claim 8, wherein the two hollow legs of the coupling mechanism include an upper hollow leg and a lower hollow leg, wherein said upper hollow leg is coupled to said upper anchor plate of said shield and extends outward perpendicularly from said shield, wherein said lower hollow leg is coupled to said lower anchor plate and extends outward perpendicularly from said shield.

10. The protective device of claim 8, wherein One fastening plate is welded to each of said hollow legs for integrally coupling said upper hollow leg to said upper anchor plate and said shield and said lower hollow leg to said lower anchor plate and said shield.

11. The protective device of claim 7, wherein the bracket has a corner having a wedge-shaped brace for reinforcement.

12. The protective device of claim 7, further comprising a pair of bolts for integrally coupling said fastening plates of said coupling mechanism to said anchor plates of said shield.

13. The protective device of claim 7, wherein the fastening plates are welded to the anchor plates of the shield.

14. The protective device of claim 7, wherein the U-shaped bar is secured by a pair of bolts to the bar of the bracket which removably secures said clamping bracket around said axle and locks said U-shaped bar and internal crescent member to said bar of said bracket.

15. The protective device of claim 7, wherein a plurality of protective devices are secured around at least one axle of a flatbed of a truck.

16. The protective device of claim 7, wherein the grated shield has a plurality of substantially round holes extending therethrough.

17. The protective device of claim 7, wherein the U-shaped bar is secured secure by a pair of bolts to the bar of the bracket, such that the ends of the U-shaped bar straddle the receiving leg of the bracket adjacent the distal end, wherein one end of said U-shaped bar is securely positioned adjacent the distal end of the bar of the bracket and wherein the other end of the U-shaped bar is securely positioned between the receiving legs of the bracket.

* * * * *